July 1, 1930.  C. S. TEITSWORTH  1,769,476
CONTINUOUS ACID WASHED SAND FILTER
Filed Aug. 9, 1929
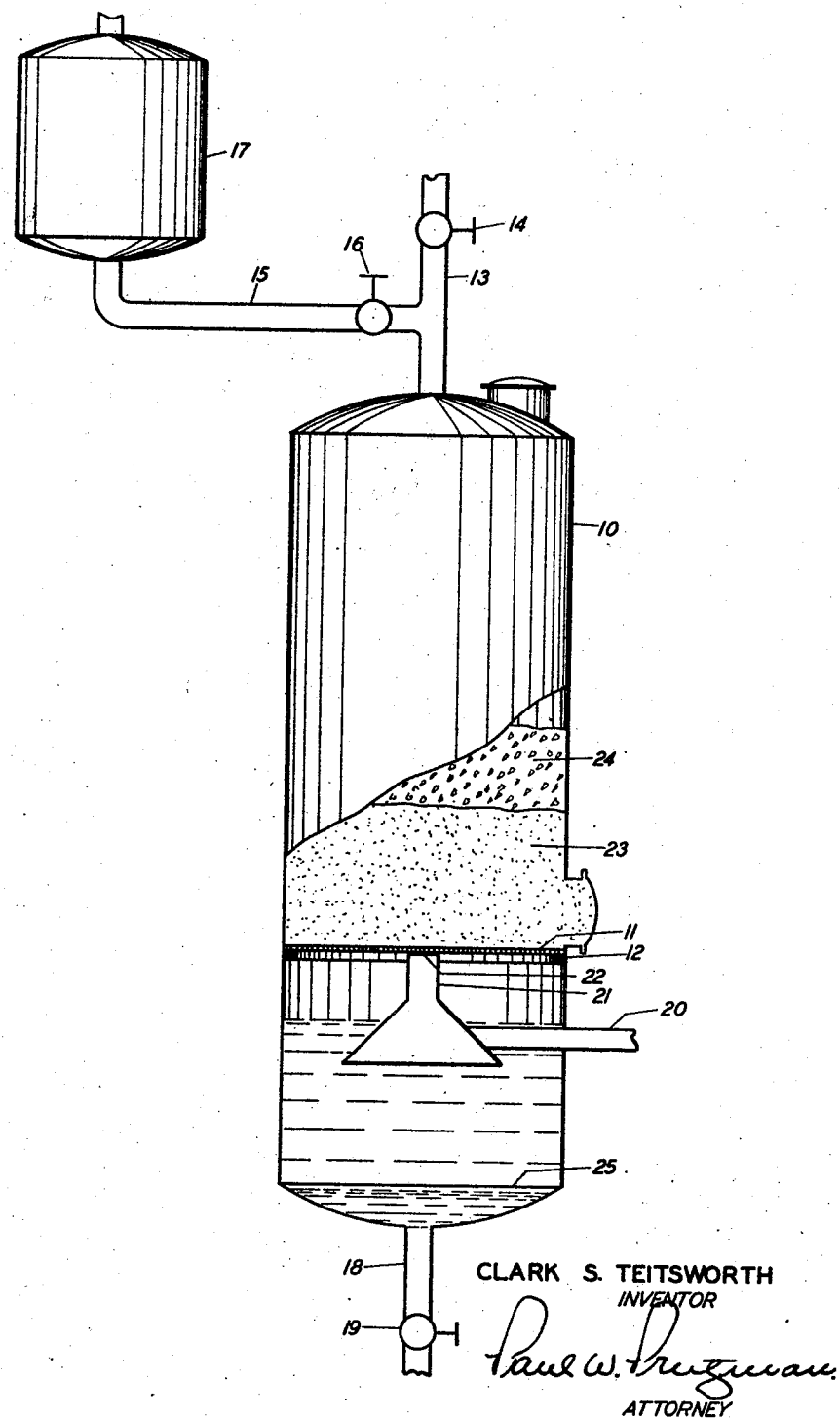
CLARK S. TEITSWORTH
INVENTOR
ATTORNEY Patented July 1, 1930

1,769,476

UNITED STATES PATENT OFFICE

CLARK S. TEITSWORTH, OF LOS ANGELES, CALIFORNIA, ASSIGNOR TO GENERAL PETROLEUM CORPORATION OF CALIFORNIA, A CORPORATION OF DELAWARE

CONTINUOUS ACID-WASHED SAND FILTER

Application filed August 9, 1929. Serial No. 384,753.

My invention pertains to the art of refining petroleum oils with sulfuric acid, to the removal of the acid sludge from the oil by means of sand filters, and specifically to a method by which such filters may be prevented from choking or coating with sludge and may thus be made substantially continuous in their operation.

Light petroleum products, such as gasoline and kerosene, are usually purified by vigorous agitation with strong sulfuric acid, the reaction of the acid with certain impurities in the oil producing an acid sludge which retains small quantities of free sulfuric acid and also contains much greater proportions of reaction products of an acid nature. This sludge is much more viscid and sticky than the original acid. As produced by the agitation above referred to a portion of this sludge is present in the treated oil in a state of extreme subdivision. On standing, the coarser particles of sludge settle from the oil but the finer particles, which may be present in the form of a dark colored cloud consisting of microscopic particles, strongly resists settling.

Most acid sludges are of such nature that when they are brought into contact with alkali solutions or even with water the acid constituents are split off and a bituminous residue remains. This residue is of a black color and has high tinctorial value, and as it is quite readily soluble in the oil (which the original sludge is not) the addition of water or aqueous solutions to an oil containing sludge is highly detrimental to the color and purity of the finished product. For this reason the washing of acid treated oils with water or with aqueous solutions is usually avoided, or is delayed until after the substantially complete removal of the sludge by a different treatment.

The purpose of the sand filter in a treatment of this nature is to remove from the acid oil such of the finer sludge particles as fail to settle out. On passing a stream of oil containing such minute particles through a bed composed of finely divided and nonreactive mineral fragments (of which clean sand is the best example) the surfaces of the fragments or grains is preferentially wetted by the sludge, which is thus withdrawn from the oil stream. The sand grains gradually become coated with sludge and, if the operation be not too long continued, the effluent oil stream is practically free from sludge and from suspended acids. In such condition its content of dissolved acidity may be neutralized with impunity by a wet treatment.

It will be obvious that if this operation could be continued long enough the interstices between the sand grains would become choked with viscid sludge and the permeability of the filter bed would be destroyed. However, the filter passes out of function long before this stage is reached for the reason that, once completely coated with sludge, the sand grains no longer have the power to lay hold of and retain further sludge particles, which thus pass through the filter with the oil. When this stage is reached the sand grains must be cleaned by having the sludge layers removed from their surfaces and is to this cleaning operation that my present invention is directed.

It has heretofore been known that sand filters used in the manner above described may be cleaned by washing out the sludge with water, washing out the remainder of the sludge with steam, by which the grains are likewise heated, and finally blowing air through the pack until the water is removed by evaporation. I have also disclosed in a companion application filed as of this present date, Serial No. 384,752, that such sand packs may be cleaned without the use of steam or air by flushing out the sludge with water, draining and displacing the remainder of water from the sand by soaking with oil. Both of these processes are intermittent, the filter being used until its component grains are coated and then being shut down for cleaning.

In the process of my present invention the filtering operation is made continuous by so manipulating the filter that the sand grains are prevented from becoming coated with sludge while their preferential attraction for sludge particles is indefinitely maintained.

The manner in which I accomplish this result may best be explained in connection with the attached drawing, Figure 1, in which 10 is a preferably cylindrical shell having a permeable grid or screen 11 supported on a ring 12 at a point materially above its bottom. Into the top of the shell I lead a pipe 13 controlled by a valve 14, this pipe communicating with a source of supply of acid treated oil not shown. A branch pipe 15 controlled by a valve 16 communicates with an acid supply tank 17. From the bottom of the shell a pipe 18 controlled by a valve 19 leads to a place of disposal of acid sludge, not shown. Through the side of the shell, at a point substantially below the grid, I introduce a pipe 20 terminating, inside the shell, in the inverted funnel indicated at 21, the upper end 22 of this funnel being closed.

On top of the grid and supported by a sufficiently fine wire screen not shown I place a layer of sand or equivalent granular non-reactive fragmental material, indicated at 23, and above this a layer of coarser fragmental material 24, such as ¼" crushed rock.

The lower layer is the sand filter proper and may be from two feet to five feet in thickness. It should be of material suited to that use, for example, of clean sand or of crushed hard clay, brick, pottery or rock, carefully screened to the desired range of size (say from 20 to 40 mesh) and free from dust. The upper layer is designed to hold the lower in position and to take the impact of the entering oil stream. It may be of broken rock or similar material and screened to ⅛" to ½" mesh. Many ways of building up these percolating beds are known and are a matter of individual preference. I do not restrict myself to any particular construction of sand filter, as my invention is equally applicable to all.

When a stream of oil containing finely divided particles of acid sludge is conducted through the above apparatus, as by opening valve 14, closing valve 19 and conducting away the effluent gasoline through pipe 20, the sand grains lay hold of the sludge particles and the gasoline stream comes through clean and free from sludge. After a time the sand grains become sludge coated and thereafter their capacity for retaining sludge is lost and the oil comes through with a part or all of its original content of sludge.

Before this stage is reached, as for instance at the moment when the first faint indications of sludge appear in the effluent oil, I clean and recondition the filter in the following simple manner. I open valve 16 and rapidly admit a sufficient quantity of sulfuric acid to at least cover the upper surface of the upper layer 24, and preferably enough to cover it to the depth of an inch or more. This may be done with or without closing gasoline valve 14, but if it be closed during the addition of the acid it should be opened immediately thereafter. The acid, by reason of its superior weight and the pressure of gasoline (or other oil) over it, will rapidly percolate through the filter, covering the sand grains and dissolving from them the skins or layers of sludge with which they are coated. Practically all sulfuric acid sludges are freely and completely soluble in sulfuric acid of from 90% to 100% strength when thus exposed in thin layers.

The solution of sludge in acid is fluid and coherent and, when it passes out of the sand pack through the screen at the bottom, drops immediately to the bottom of the filter chamber where it forms a pool beneath the desludged oil, as indicated at 25. This pool, which consists of relatively strong acid, may either be wasted or may be pumped back to be used at a suitable stage in the prior acid treatment of the stream, according to its strength.

It will be noted that this procedure leaves the sand grains coated with acid, but unlike sludge, the acid coating does not lower the ability of the sand grain surface to attach and hold the minute sludge particles entering with the oil to be desludged. The acid wash therefore reconditions and restores the desludging power of the filter, and this condition is maintained until the acid skins have been displaced from the sand grains by the flow of oil or saturated with fresh sludge, at which time the wash must be repeated.

The intervals between the washes will obviously depend on the proportion of sludge contained in the oil to be filtered and on the rapidity with which such oil is passed through the filter. By way of example, a wash equivalent to an inch of acid in the filter shell may have to be repeated every two or three hours, but in any case the wash should be repeated when the effluent oil shows traces of sludge.

As the acid used for washing is recovered in close to its original strength and in a condition such as to entirely fit it for reuse in the treatment, the cost of this operation is a disappearing factor. The separation of sludge is perhaps not quite so complete as where the spent sand is washed and dried but it is sufficiently complete for many purposes, and is always useful as a preliminary to treatment with dry sand, greatly reducing the load on the dry sand filter.

While I have described the application of my invention to intermittent washes of the sand filter I wish to state that such washing effect may also be applied continuously, a relatively small quantity of fresh acid being introduced over the surface of the upper layer in streams or drops, care being taken to so distribute this acid that it will not channel down through the sand but will reach all parts of the pack. Where the acid is thus continuously applied the sludge is kept constantly in a fluent condition and moving downwardly through the pack and the sand grains are thus kept coated with acid containing some sludge but not a sufficient proportion thereof to prevent the attachment of sludge particles withdrawn from the oil. In thus applying the acid continuously it is not desirable to distribute it by finely dividing it in the entering oil stream, as this is likely to lead merely to the production of a further quantity of sludge and the destruction of the solvent power of the acid.

While my invention is particularly applicable to the acid treatment of gasoline, kerosene and other nonviscous products of petroleum it is also applicable in many cases to the treatment of more viscous oils and of oils from other sources, and I desire to claim the method for any purpose for which it may prove to be suitable.

I claim as my invention:

1. The method of desludging and reconditioning sand filters containing sludge resulting from treatment of mineral oils with sulfuric acid which comprises percolating nonsludged sulfuric acid through the sand for the solution and removal of the sludge therefrom.

2. The method of desludging and reconditioning sand filters containing sludge resulting from treatment of mineral oils with sulfuric acid which comprises intermittently percolating nonsludged sulfuric acid through the sand for the solution and removal of the sludge therefrom.

3. The method of desludging and reconditioning sand filters containing sludge resulting from treatment of mineral oils with sulfuric acid which comprises percolating through the sand for the solution and removal of the sludge therefrom sulfuric acid of not less than 90% nor more than 100% strength.

4. The method of desludging and reconditioning sand filters containing sludge resulting from treatment of mineral oils with sulfuric acid which comprises intermittently percolating through the sand for the solution and removal of the sludge therefrom doses of sulfuric acid of not less than 90% nor more than 100% strength.

5. The method of maintaining desludging sand filters in unimpaired usefulness which comprises: filtering through said filters mineral oil containing sludge resulting from the treatment of said oil with sulfuric acid, until traces of sludge appear in the effluent oil and feeding fresh sulfuric acid through said filters to maintain the sludge-retaining power of said sand.

6. The method of maintaining desludging sand filters in unimpaired usefulness which comprises: feeding through said filters mineral oil containing sludge resulting from the treatment of said oil with sulfuric acid, feeding fresh sulfuric acid through said filters to maintain the sludge-retaining power of said sand, causing said acid and any sludge absorbed therein to pass from said filters, and separating said acid and sludge from the effluent oil.

7. The method of continuously treating sludge-containing oil for the removal therefrom of sludge resulting from treatment of mineral oils with sulfuric acid which comprises: feeding said sludge-containing oil through a sand filter for the removal of sludge from the oil; feeding fresh sulfuric acid through the sand for the removal of sludge from the sand; causing said acid and the sludge removed from the sand to pass from the filter, and separating said acid and sludge from the desludged effluent oil.

In witness that I claim the foregoing I have hereunto subscribed my name this 20th day of July, 1929.

CLARK S. TEITSWORTH.